(12) United States Patent
Tener

(10) Patent No.: US 10,893,134 B1
(45) Date of Patent: Jan. 12, 2021

(54) DISPOSABLE PHONE CASE INCLUDING FITTING MEANS

(71) Applicant: Ashley Tener, Brooklyn, NY (US)

(72) Inventor: Ashley Tener, Brooklyn, NY (US)

( * ) Notice: Subject to any disclaimer, the term of this patent is extended or adjusted under 35 U.S.C. 154(b) by 0 days.

(21) Appl. No.: 16/985,961

(22) Filed: Aug. 5, 2020

(51) Int. Cl.
| | | |
|---|---|---|
| *H04M 1/17* | (2006.01) | |
| *H04B 1/3888* | (2015.01) | |
| *G06F 1/16* | (2006.01) | |
| *H04B 1/3877* | (2015.01) | |

(52) U.S. Cl.
CPC ............ *H04M 1/17* (2013.01); *G06F 1/1626* (2013.01); *H04B 1/3877* (2013.01); *H04B 1/3888* (2013.01); *G06F 2200/1633* (2013.01)

(58) Field of Classification Search
CPC combination set(s) only.
See application file for complete search history.

(56) References Cited

U.S. PATENT DOCUMENTS

| | | |
|---|---|---|
| 1,861,864 A | 6/1932 | Kennedy |
| 1,920,824 A | 8/1933 | West |
| 2,777,491 A | 1/1957 | Ashton et al. |
| 2,799,611 A | 7/1957 | Dreisbach |
| 3,029,853 A | 4/1962 | Piazze |
| 3,114,497 A | 12/1963 | Kugler |
| 3,196,757 A | 7/1965 | Samways |
| 3,283,994 A | 11/1966 | Miller |
| 4,493,683 A | 1/1985 | Jostler |
| 4,786,191 A | 11/1988 | Broderick et al. |
| 4,792,241 A | 12/1988 | Broderick et al. |
| 5,057,065 A | 10/1991 | Buchman |
| 5,952,420 A | 9/1999 | Senkus et al. |
| 6,646,864 B2* | 11/2003 | Richardson ........... G06F 1/1626 206/305 |
| 9,866,255 B1* | 1/2018 | Ketter-Muldrow .... A45C 13/10 |
| 10,080,408 B1 | 9/2018 | Wood |
| D842,289 S * | 3/2019 | Feng ............................ D14/250 |
| 10,441,064 B2 | 10/2019 | Watkins |
| 2011/0240509 A1* | 10/2011 | Smart ..................... H04M 1/18 206/524.6 |
| 2015/0194997 A1* | 7/2015 | Johnson ................. A45C 11/00 455/575.8 |
| 2015/0305480 A1* | 10/2015 | Brousseau ............... B25G 3/00 224/267 |
| 2016/0212252 A1* | 7/2016 | Parker .................. H04B 1/3888 |
| 2020/0060401 A1 | 2/2020 | Aghazadeh et al. |

OTHER PUBLICATIONS

Goulding (2003). In Chapter 44, "Pressure-Sensitive Adhesives" in Pizzi, et al. Handbook of adhesive technology, revised and expanded. CRC press, 1-16.

\* cited by examiner

*Primary Examiner* — Phung-Hoang J Nguyen
(74) *Attorney, Agent, or Firm* — Caesar Rivise, PC

(57) ABSTRACT

A case for PDAs is disclosed. The case is particularly suitable for maintaining mobile telephones free of infectious agents. The case includes a barrier material defining a body configured to enclose a PDA, and at least one fastener, wherein: (a) the case is configured to convert between a relaxed configuration which facilitates transfer of the PDA into and out of the case, and a fitted configuration which conforms more closely to the PDA enclosed therein, (b) the at least one fastener is configured to reversibly retain the case in the fitted configuration, and (c) the barrier material is effective to prevent viruses and bacteria from penetrating therethrough.

7 Claims, 8 Drawing Sheets

DISPOSABLE PHONE CASE INCLUDING FITTING MEANS

BACKGROUND OF THE INVENTION

1. Field of Invention

This invention relates to covers for personal digital assistants (PDAs), and more particularly to disposable covers for mobile telephones.

2. Description of Related Art

Mobile telephones (i.e., "cell phones") have become an essential communication device carried most everywhere by most everyone. Due to the prevalence, importance, value and perceived fragility of mobile telephones, a vast variety of protective cases have been developed. These cases are generally designed to protect the telephone from physical damage rather than protecting the user. See, e.g., U.S. Pat. No. 6,646,864 (Richardson), which is one of hundreds of patents for PDA and phone cases assigned to the maker of the popular OTTER BOX line of protective cases for cell phones.

U.S. Ser. No. 10/080,408 B1 (Wood) discloses a cell phone case and wallet comprising a plurality of panels and a plurality of straps.

U.S. Ser. No. 10/441,064 B2 (Watkins) discloses a cell phone case designed to include one or more interchangeable bracelet elements designed to be worn around a user's wrist and/or forearm.

Disposable cases have been developed to keep phones clean under normal operating conditions. For example, US 20160212252A1 discloses an antimicrobial cell phone casing for preventing the accumulation of microbes on and the spread of microbes from the surface of a mobile device. The casing is a rectangular plastic bag coated with an antimicrobial film coating, and comprising an opening which is resealable using press-to-seal ziplock fasteners, a set of top sound holes, and a set of bottom holes.

US 20020060401 A1 discloses a sterile enclosure to bring a non-sterile hand-held electronic device such as a smartphone or a tablet into a sterile field. The enclosure comprises a rigid frame, a rigid base and a device holder configured to prevent contamination of sterile components during use.

Despite the foregoing developments, there remains a need for disposable cases for cell phones and other PDAs having improved properties.

In view of the COVID-19 pandemic, it would be desirable to provide a disposable case for a mobile telephone, which keeps the telephone free of infectious agents in the external environment.

All references cited herein are incorporated herein by reference in their entireties.

BRIEF SUMMARY OF THE INVENTION

Accordingly, the invention comprises a case comprising: a barrier material defining a body configured to enclose a personal digital assistant (PDA); and at least one fastener, wherein: (a) the case is configured to convert between a relaxed configuration which facilitates transfer of the PDA into and out of the case, and a fitted configuration which conforms more closely to the PDA enclosed therein, (b) the at least one fastener is configured to reversibly retain the case in the fitted configuration, and (c) the barrier material is effective to prevent viruses and bacteria from penetrating therethrough.

In certain embodiments, the PDA is a mobile telephone.
In certain embodiments, the barrier material is transparent and elastic.
In certain embodiments, the barrier material comprises at least one of latex, nitrile rubber, chloroprene, polyethylene and vinyl.
In certain embodiments, the barrier material consists essentially of nitrile rubber.
In certain embodiments, the at least one fastener is a strap having one end permanently attached to a body of the case and a free end not permanently attached to the body of the case, and the case further comprises a pressure-sensitive adhesive on at least one of the body and the free end of the strap, which is effective to reversibly bond the free end of the strap to the body of the case.
In certain embodiments, the at least one fastener is a drawstring encased within a chamber along a perimeter of an opening of the case.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF PREFERRED EMBODIMENTS OF THE INVENTION

The inventive case is a disposable, adjustable, fitted, phone cover, which preferably allows full usage of the phone (i.e., does not restrict or substantially inhibit screen display, touch-sensitivity, speakers, charging and/or the use of non-wireless headphones), while providing barrier protection against infectious agents including but not limited to viruses and bacteria. The case (also referred to as a "cover") additionally provides barrier protection against chemicals and oils in preferred embodiments.

The case comprises a polymeric material, which is preferably transparent or translucent, flexible and impenetrable by bacteria and viruses. Preferred polymers include latex, nitrile rubber, chloroprene, polyethylene and vinyl.

In preferred embodiments, the case includes at least one fastener which is effective to tailor the fit of the case to a variety of phones (and other PDAs) of different sizes and shapes. The case is also capable of fitting over a more permanent case holding the phone. Loosely fit material of the case in its unfitted state is tightened and releasably held by the at least one fastener. This reduces at least one dimension of the case in its unfitted state so as to tailor the fit of the case to contents of the case in its fitted state. Suitable fasteners include but are not limited to straps, belts, drawstrings, ropes, cords, threads, clips, clamps, adhesives, hook-and-loop fasteners, buttons, folds and tapes.

Preferred adhesives are pressure-sensitive adhesives which reversibly bond to the materials from which the case is fabricated. Suitable pressure-sensitive adhesives include but are not limited to those described in U.S. Pat. No. 5,952,420 and the references cited therein, and to those described by Goulding in Chapter 44, "Pressure-Sensitive Adhesives" in Pizzi, et al. Handbook of adhesive technology, revised and expanded. CRC press, 2003.

In certain embodiments including the use of adhesive, the adhesive is provided at a thickness of about 1 µm to about 20 µm, or about 1 µm to about 10 µm, or about 2.5 µm to about 3.5 µm.

Figure 1A:
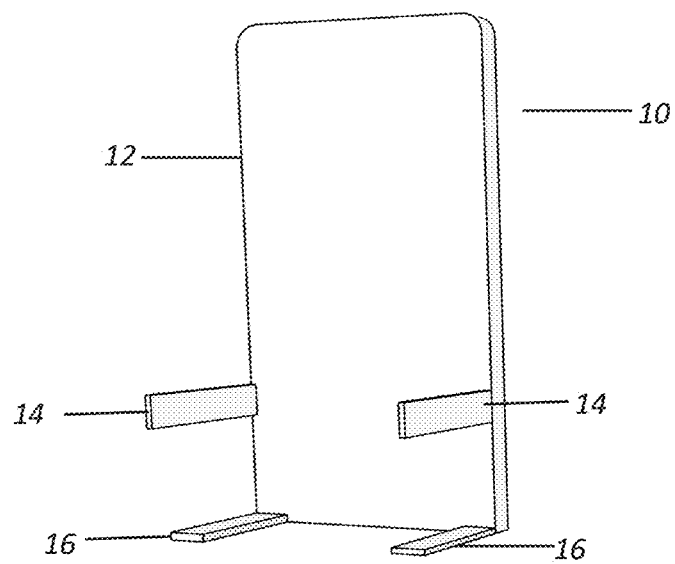
FIG. 1A shows a rear perspective view of a first embodiment of the case of the invention in an unfitted state.
Figure 1B:
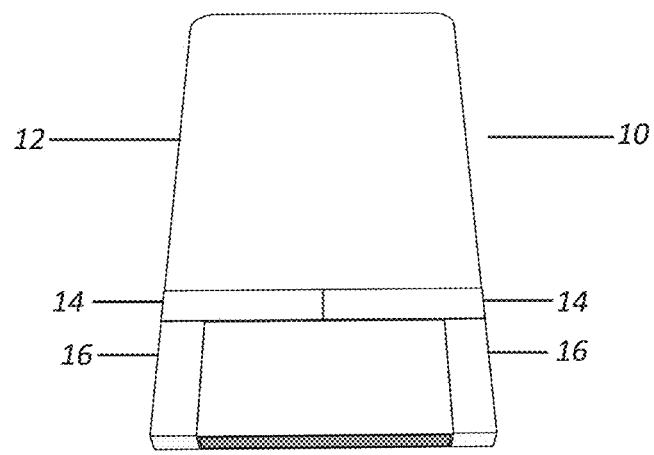
FIG. 1B shows a bottom perspective view of the first embodiment in a fitted state.

Referring to FIG. 1A, case 10 includes body 12 having side demi-straps 14 attached to opposite sides of body 12 and bottom straps 16 attached to the bottom of body 12. Referring to FIG. 1B, the free ends of demi-straps 14 and bottom straps 16 are releasably adhered to body 12 by an adhesive to achieve a tight fit of case 10 to the phone (not shown) encased therein. The straps can be unitarily formed with the body 12 or can be formed independently of the body 12 and permanently affixed to the body 12 at a fixed end of each strap.

Figure 2A:
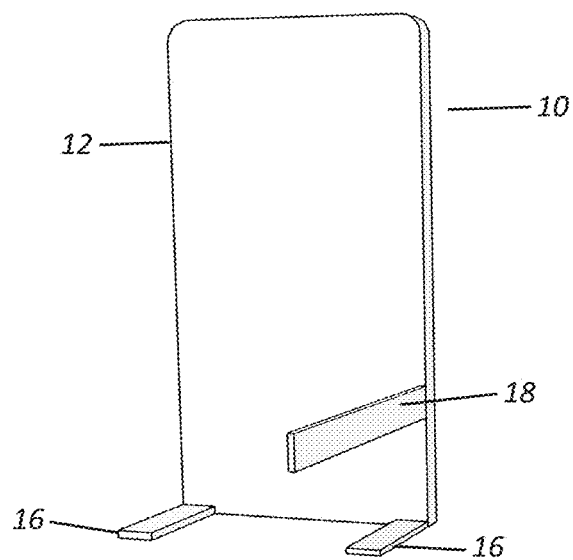
FIG. 2A shows a rear perspective view of a second embodiment of the case of the invention in an unfitted state.

In the embodiment of FIG. 2A, case 10 includes body 12 having full-width strap 18 attached to one side of body 12 and bottom straps 16 attached to the bottom of body 12.

Figure 2B:
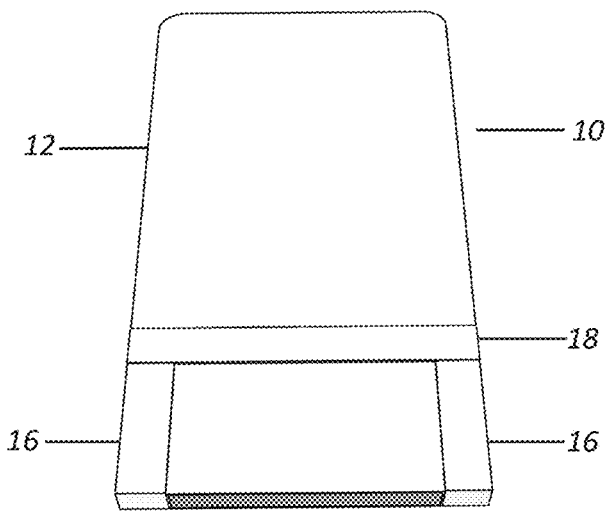
FIG. 2B shows a bottom perspective view of the second embodiment in a fitted state.

Referring to FIG. 2B, the free ends of full-width strap 18 and bottom straps 16 are adhered to body 12 by an adhesive to achieve a tight fit of case 10 to phone (not shown) encased therein.

Figure 3A:
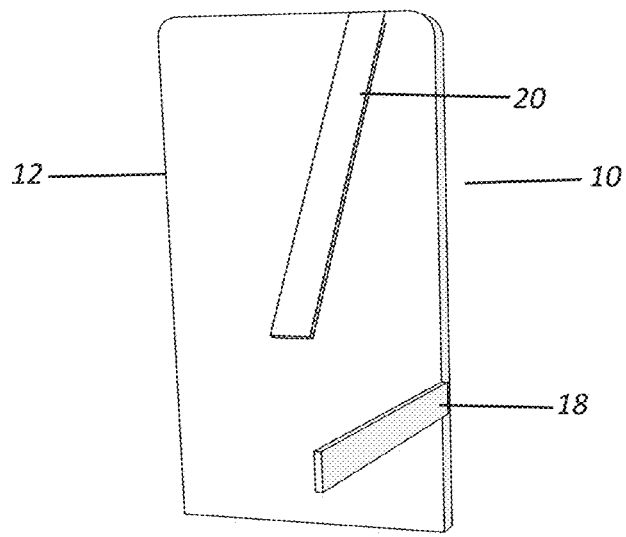
FIG. 3A shows a rear perspective view of a third embodiment of the case of the invention in an unfitted state.

Referring to FIG. 3A, case 10 includes body 12 having three-quarters length strap 20 attached to the top of body 12 and full-width strap 18 attached to one side of body 12.

Figure 3B:
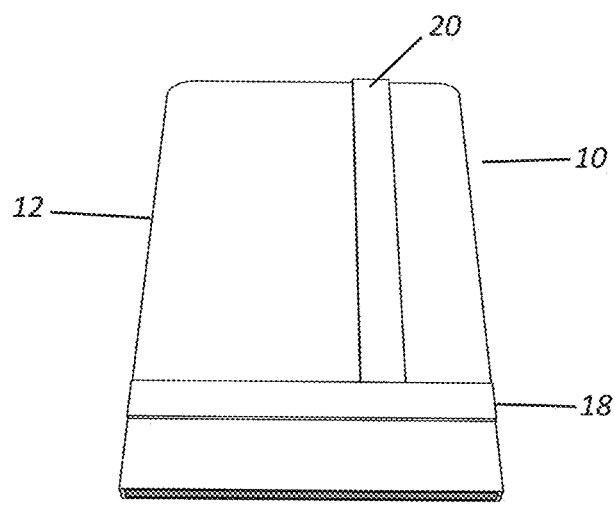
FIG. 3B shows a bottom perspective view of the third embodiment in a fitted state.

Referring to FIG. 3B, the free ends of three-quarters length strap 20 and full-width strap 18 are adhered to body 12 by an adhesive to achieve a tight fit of case 10 to phone (not shown) encased therein.

Figure 4A:
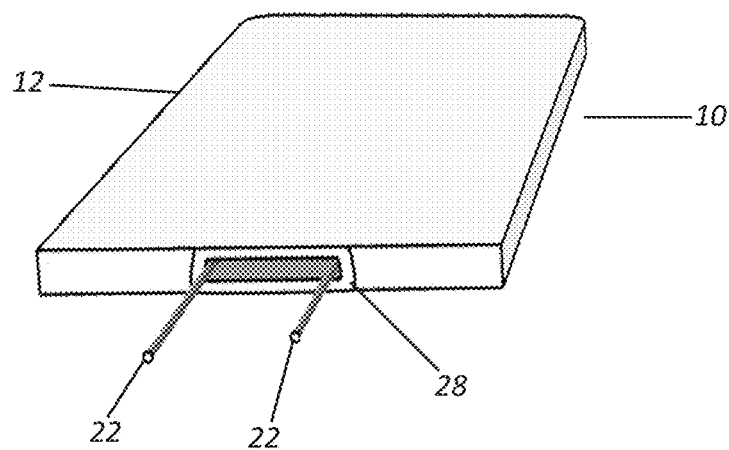
FIG. 4A shows a bottom perspective view of a fourth embodiment of the case of the invention in an unfitted state.

Referring to FIG. 4A, case 10 includes body 12 having center drawstrings 22 exiting through grommet 28 at bottom of body 12.

Figure 4B:
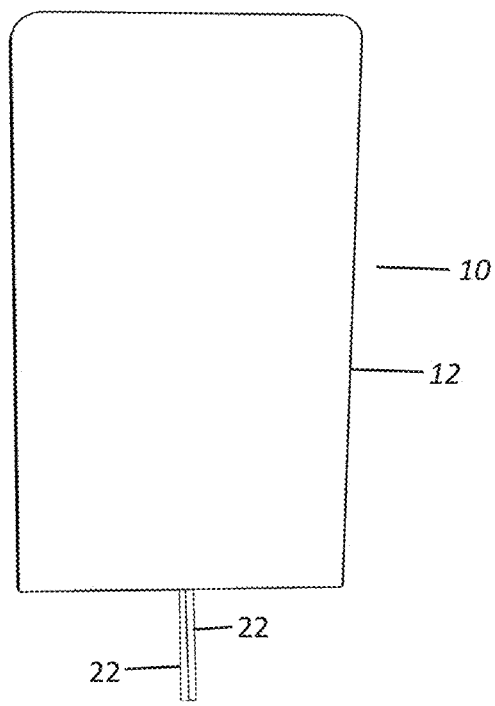
FIG. 4B shows a front view of the fourth embodiment in a fitted state.

Referring to FIG. 4B, the ends of center drawstrings 22 are pulled taught (and optionally tied or otherwise fastened) to achieve and hold in place a tight fit of case 10 to phone (not shown) encased therein.

Figure 5A:
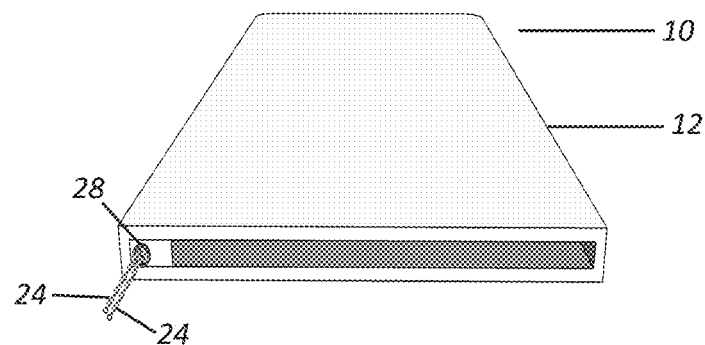
FIG. 5A shows a bottom perspective view of a fifth embodiment of the case of the invention.

Referring to FIG. 5A, case 10 includes body 12 having corner drawstrings 24 exiting through grommet 28 at one end of the bottom of body 12.

Figure 5B:
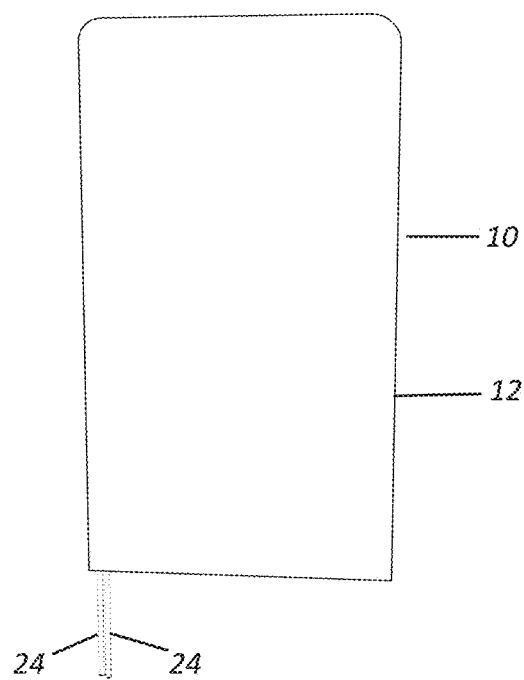
FIG. 5B shows a front view of the fifth embodiment of the case.

Referring to FIG. 5B, the ends of corner drawstrings 24 are pulled taught (and optionally tied or otherwise fastened) to achieve and hold in place a tight fit of case 10 to phone (not shown) encased therein.

Figure 6A:
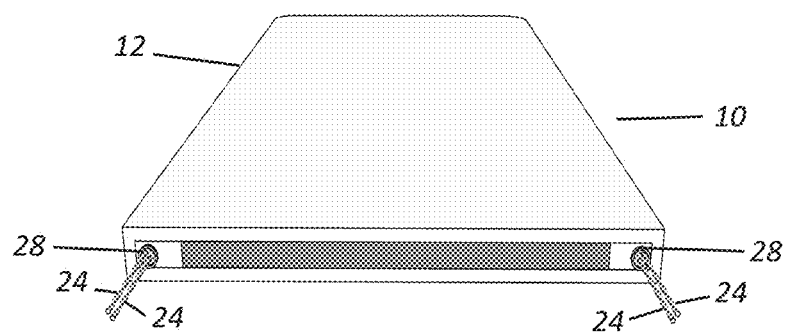
FIG. 6A shows a bottom perspective view of a sixth embodiment of the case of the invention.

Referring to FIG. 6A, case 10 includes body 12 having corner drawstrings 24 exiting through grommets 28 at both ends of the bottom of body 12.

Figure 6B:
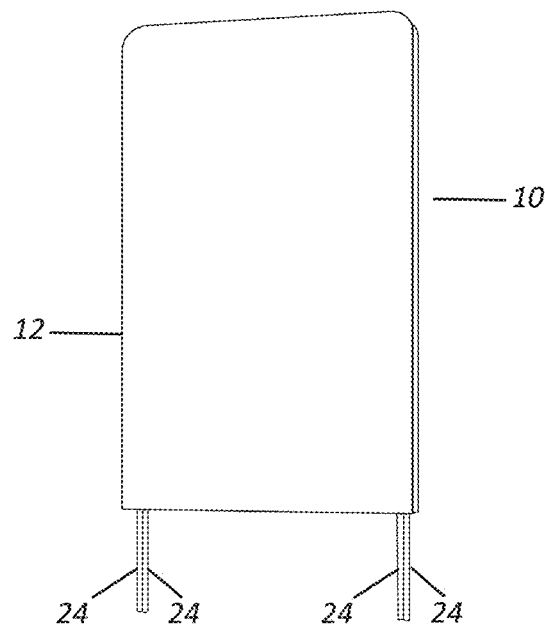
FIG. 6B shows a front perspective view of the sixth embodiment of the case.

Referring to FIG. 6B, the ends of corner drawstrings 24 are pulled taught (and optionally tied or otherwise fastened) to achieve and hold in place a tight fit of case 10 to phone (not shown) encased therein.

Figure 7A:
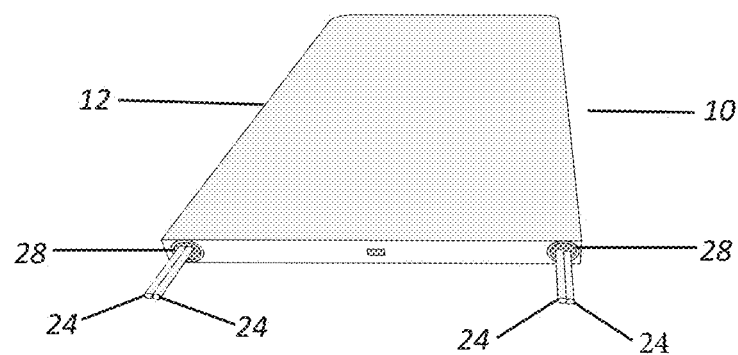
FIG. 7A shows a bottom perspective view of a seventh embodiment of the case of the invention.

Referring to FIG. 7A, case 10 includes body 12 having corner drawstrings 24 exiting through grommets 28 at both ends of bottom of body 12.

Figure 7B:
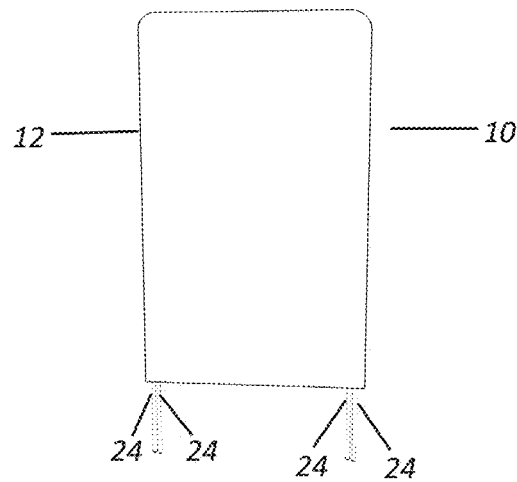
FIG. 7B shows a front view of the seventh embodiment of the case.

Referring to FIG. 7B, ends of corner drawstrings 24 are pulled taught (and optionally tied or otherwise fastened) to achieve and hold in place a tight fit of case 10 to phone (not shown) encased therein.

Figure 7C:
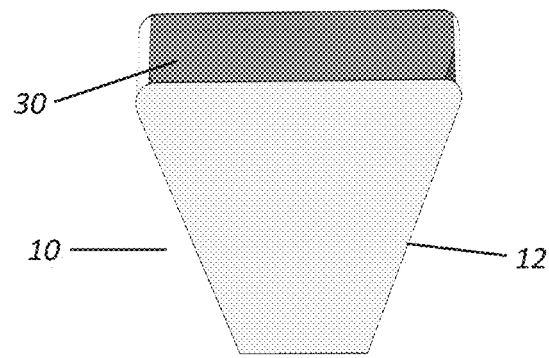
FIG. 7C shows a top perspective view of the seventh embodiment of the case.

FIG. 7C shows opening 30 of case 10 for insertion and removal of phone (not shown). Opening 30 is reversibly sealable by adhesive strip (not shown) along top of outer wall of body 12 pressed against inner wall of body 12 where the dotted line is shown.

Figure 8A:
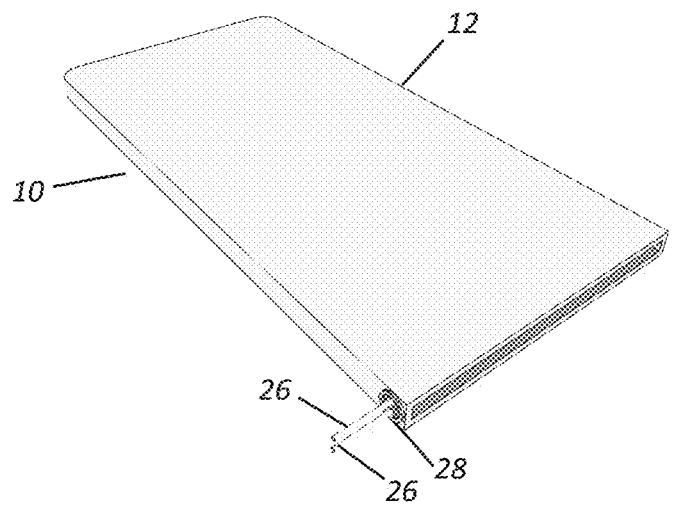
FIG. 8A shows a bottom perspective view of an eighth embodiment of the case of the invention.

Referring to FIG. 8A, case 10 includes body 12 having side drawstrings 26 exiting through grommet 28 on the side of body 12.

Figure 8B:
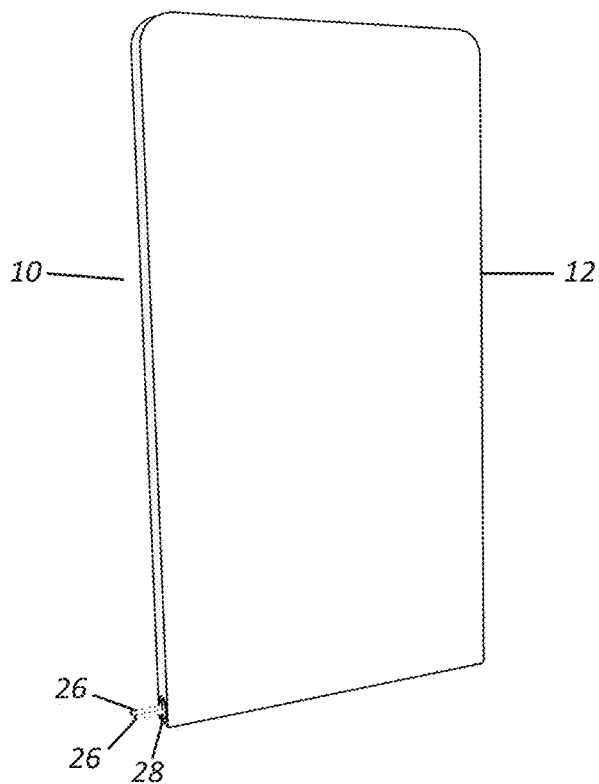
FIG. 8B shows a front perspective view of the eighth embodiment of the case.

Referring to FIG. 8B, ends of drawstrings 26 are pulled taught (and optionally tied or otherwise fastened) to achieve and hold in place a tight fit of case 10 to phone (not shown) encased therein.

The case can be manufactured in any of several ways, such as by molding, dip coating, spray coating, extruding, cutting, or 3-D printing.

Any straps on the body of the case can be prepared as a unitary part of the body or can be applied to the body (e.g., by adhesive bonding, melt bonding, stitching, or the like) such that one end is permanently bonded thereto.

In drawstring containing embodiments, the channel in which the drawstring is placed can be formed by, e.g., folding an edge of the body over itself and bonding the folded portion to the main portion of the body to provide the channel for receiving the drawstring. See also U.S. Pat. Nos. 1,861,864, 1,920,824, 2,777,491, 2,799,611, 3,029,853, 3,114,497, 3,196,757, 3,283,994, 4,493,683, 4,786,191, 4,792,241 and 5,057,065 for additional methods for providing articles containing drawstrings.

While the invention has been described in detail and with reference to specific examples thereof, it will be apparent to one skilled in the art that various changes and modifications can be made therein without departing from the spirit and scope thereof.

What is claimed is:

1. A case comprising:
a barrier material defining a body configured to enclose a personal digital assistant (PDA); and at least one fastener,
wherein: (a) the case is configured to convert between a relaxed configuration which facilitates transfer of the PDA into and out of the case, and a fitted configuration which conforms more closely to the PDA enclosed therein, (b) the at least one fastener is configured to reversibly retain the case in the fitted configuration, (c) the barrier material is effective to prevent viruses and bacteria from penetrating therethrough and (d) the at least one fastener is a strap having one end permanently attached to a body of the case and a free end not permanently attached to the body of the case, and the case further comprises a pressure-sensitive adhesive on at least one of the body and the free end of the strap, which is effective to reversibly bond the free end of the strap to the body of the case.

2. The case of claim 1, wherein the PDA is a mobile telephone.

3. The case of claim 2, wherein the barrier material is transparent and elastic.

4. The case of claim 3, wherein the barrier material comprises at least one of latex, nitrile rubber, chloroprene, polyethylene and vinyl.

5. The case of claim 4, wherein the barrier material consists essentially of nitrile rubber.

6. The case of claim 1, wherein the barrier material is an elastic material comprising at least one of latex, nitrile rubber, chloroprene, polyethylene and vinyl.

7. The case of claim 1, wherein the barrier material is translucent.

* * * * *